US006343908B1

(12) United States Patent
Oudsten et al.

(10) Patent No.: US 6,343,908 B1
(45) Date of Patent: Feb. 5, 2002

(54) PASSENGER ENTRANCE RAMP FOR MASS TRANSIT VEHICLE

(75) Inventors: Jan den Oudsten, Winnipeg (CA); Harry Boxhoorn, TD Woerden (NL); Gordan Draskovic, Winnipeg (CA); Glenn Campbell, Winnipeg (CA); Dean B. Melanson, Winnipeg (CA); Adrian Marica, Winnipeg (CA)

(73) Assignee: New Flyer Industries Limited, Winnipeg (CA)

(*) Notice: Subject to any disclaimer, the term of this patent is extended or adjusted under 35 U.S.C. 154(b) by 0 days.

(21) Appl. No.: 09/553,751

(22) Filed: Apr. 21, 2000

(51) Int. Cl.[7] .................................................. B60P 1/00

(52) U.S. Cl. ....................................... 414/537; 414/921

(58) Field of Search ................................ 414/537, 556, 414/558, 921; 296/61

(56) References Cited

U.S. PATENT DOCUMENTS

| | | | | | |
|---|---|---|---|---|---|
| 4,381,899 A | * | 5/1983 | Merkle | ....................... | 414/921 |
| 4,792,274 A | * | 12/1988 | Cockram | .................... | 414/537 |
| 5,391,041 A | | 2/1995 | Stanbury et al. | ............ | 414/537 |
| 5,871,329 A | * | 2/1999 | Tidrick et al. | .............. | 414/537 |
| 6,179,545 B1 | * | 1/2001 | Petersen, Jr. et al. | ....... | 414/537 |

FOREIGN PATENT DOCUMENTS

| | | | |
|---|---|---|---|
| FR | 2598362 | * 11/1987 | ................. 414/537 |

* cited by examiner

*Primary Examiner*—James W. Keenan
(74) *Attorney, Agent, or Firm*—Adrian D. Battison; Michael R. Williams

(57) ABSTRACT

A public transit vehicle has a passenger entrance ramp at a door way including a support frame for mounting on the vehicle at the doorway carrying a primary ramp panel, a secondary ramp panel and a fixed platform panel. The primary panel is pivotal through 180 degrees between a retracted position inverted within the vehicle and covering the secondary panel and the fixed platform panel and a deployed position in which the primary ramp panel is inclined from an inner edge downwardly and outwardly from the vehicle to an outer edge at the ground. The primary panel is pivoted at its inner edge on an outer edge of the secondary ramp panel pivotal which is in turn pivotal about an inner horizontal axis at its inner edge. The primary and secondary ramp panels are thus arranged such that, in the retracted position, the outer edge of the secondary panel is in the raised position so that both the primary and secondary ramp panels are substantially horizontal and, in the deployed position, the outer edge is moved to the lowered position so that the primary and secondary ramp panels form a common ramp surface inclined outwardly and downwardly from the inner edge of the secondary ramp panel to the outer edge of the primary ramp panel.

18 Claims, 8 Drawing Sheets

PASSENGER ENTRANCE RAMP FOR MASS TRANSIT VEHICLE

This invention relates to passenger entrance ramp of a mass transit vehicle.

BACKGROUND OF THE INVENTION

It is a requirement of many passenger transit vehicles that there be provided a ramp system at a doorway of the vehicle so that passengers in a wheelchair can conveniently move from the ground surface adjacent to the vehicle onto the floor of the vehicle for transportation in the vehicle.

One example of a ramp arrangement which is particularly convenient for low floor transit vehicles is shown in U.S. Pat. 5,391,041, issued Feb. 21, 1995 to the present assignee.

This arrangement of ramp is suitable for low floor vehicles because it is located at floor level without any necessity for storage under the floor, bearing in mind that the low floor configuration reduces the height of the floor to a position where there is little space under the floor for storage of ramp elements. However some telescoping ramps have been provided and stored under the floor of a low floor chassis. However these are limited in the variation in incline which can be provided and are subject to failure as a consequence of continuous exposure to the elements and damage from curbs and other obstacles.

The ramp construction of the above patent therefore provides a ramp panel which is pivoted at its inner edge to the structure and rotates through an angle slightly greater than 180° from a retracted position lying flat on the floor inside the vehicle to a deployed position where it extends outwardly from the pivot axis and slightly downwardly into contact with the ground.

The length of the panel in a direction across the width of the vehicle is limited by the fact that the door is generally located at the driver compartment so that the length of the panel is slightly greater than one half the width of the vehicle. In a situation where the ramp extends from the floor height downwardly and outwardly onto a raised curb, the angle of the ramp is generally acceptable and is not excessive thus interfering with the movement of the wheelchair up a ramp and into the vehicle. However in a situation where there is no curb so that the ramp must accommodate the full height from the floor to the ground, the angle of the ramp may exceed a desirable angle. Some vehicles of this type have a kneeling action by which the front suspension of the vehicle is slightly lowered by a height of the order of two to three inches thus again reducing the angle of the ramp. However this is generally insufficient to provide a ramp of the required angle.

SUMMARY OF THE INVENTION

It is one object of the present invention, therefore, to provide an improved passenger entrance ramp for a mass transit vehicle which allows a reduced angle of the ramp without increasing the length of a primary pivoting element of the ramp and therefore its intrusion into the area of the driver's compartment.

According to a first aspect of the invention there is provided a passenger entrance ramp assembly for a public transit vehicle, the vehicle having a door way through which passengers pass for entering or departing the vehicle with a bottom edge of the doorway at floor level of the vehicle, the ramp assembly comprising:

- a support structure for mounting on the vehicle at the doorway;

- a primary ramp panel arranged at the doorway for movement between retracted position within the vehicle and a deployed position in which the primary ramp panel is inclined from an inner edge downwardly and outwardly from the vehicle to an outer edge at the ground;
- a secondary ramp panel having an outer edge at the bottom edge of the doorway and an inner edge generally parallel to the outer edge and spaced inwardly therefrom;
- the primary ramp panel being mounted for pivotal movement relative to the secondary ramp panel about an outer horizontal axis at the outer edge of the secondary ramp panel through an angle of the order of 180 degrees between the deployed position and the retracted position such that in the retracted position the primary ramp panel is inverted on top of the secondary ramp panel;
- the secondary ramp panel being mounted on the support structure for pivotal movement about an inner horizontal axis at the inner edge such that the outer edge and the outer horizontal axis move upwardly and downwardly between a raised horizontal position and a lowered position;
- the primary and secondary ramp panels being arranged such that, in the retracted position, the outer edge is in the raised position so that both the primary and secondary ramp panels are substantially horizontal and, in the deployed position, the outer edge is moved to the lowered position so that the primary and secondary ramp panels form a common ramp surface inclined outwardly and downwardly from the inner edge of the secondary ramp panel to the outer edge of the primary ramp panel.

Preferably the primary ramp panel is arranged to float at the deployed position.

Preferably the primary and the secondary ramp panels are located at the same ramp angle when deployed.

Preferably there is provided a fixed horizontal platform panel arranged at the inner edge of the secondary ramp panel and extending therefrom to an innermost edge generally parallel to the inner edge of the secondary ramp panel.

Preferably the primary ramp panel in the retracted position overlies and covers the secondary ramp panel and at least part of the platform panel.

Preferably the platform panel, the secondary ramp panel and the primary ramp panel are equal in width.

Preferably the primary ramp panel is moved between the retracted position and the deployed position by a primary panel power actuator and the secondary panel is moved between the retracted position and the deployed position by a secondary panel power actuator and wherein there is provided a control for controlling actuation of the secondary panel power actuator separately from the primary panel power actuator such that the secondary ramp panel can be actuated to move to the deployed position only if required and only after the primary ramp panel has been deployed and rotated through an angle of the order of 170 degrees relative to the secondary ramp.

Preferably the primary ramp panel is moved between the retracted position and the deployed position by a primary panel power actuator comprising a hydraulic cylinder, a first pulley connected to the cylinder, a second pulley connected to a pivot shaft of the primary ramp panel and a flexible continuous member engaged around the first and second pulleys forming communicating drive therebetween.

Preferably the primary ramp panel is moved between the retracted position and the deployed position by a primary panel power actuator and the secondary panel is moved between the retracted position and the deployed position by a secondary panel power actuator and wherein the primary and secondary panel power actuators include hydraulic actuators and are operated by a common hydraulic circuit.

Preferably the primary ramp panel is movable manually from the deployed position to the retracted position.

Preferably there is provided an abutment member for contacting the primary ramp panel when moved to the retracted position for lifting the secondary ramp panel into the retracted position.

Preferably the primary ramp panel is mounted at the outer edge of the secondary ramp panel by a hinge for pivotal movement about the hinge.

Preferably the primary ramp panel is moved between the retracted position and the deployed position by a primary panel power actuator comprising a rotary hydraulic actuator, a pivot shaft and a right angle gear box communicating drive from the actuator to the pivot shaft.

Preferably the primary ramp panel is moved between the retracted position and the deployed position by a primary panel power actuator and wherein the primary panel power actuator is mounted on the support for pivotal movement about the inner pivot axis.

Preferably movement of the secondary ramp panel is actuated by a pair of crank members each arranged at a respective side of the second ramp panel and each having a support roller engaging a respective support track on the support member for support thereby, the crank members being connected to a transverse drive shaft connected across the second ramp panel and driven by a hydraulic actuator such that rotation of the shaft causes the cranks to raise and lower the second ramp panel.

Preferably and the rollers are free to lift from the respective support track to allow manual movement of the second ramp panel from the deployed position to the retracted position.

Preferably the shaft is rotated by a drive cylinder acting on a crank connected to the shaft with a dog leg drive link between the cylinder and the crank.

BRIEF DESCRIPTION OF THE DRAWINGS

One embodiment of the invention will now be described in conjunction with the accompanying drawings in which.

DETAILED DESCRIPTION

Figure 1:
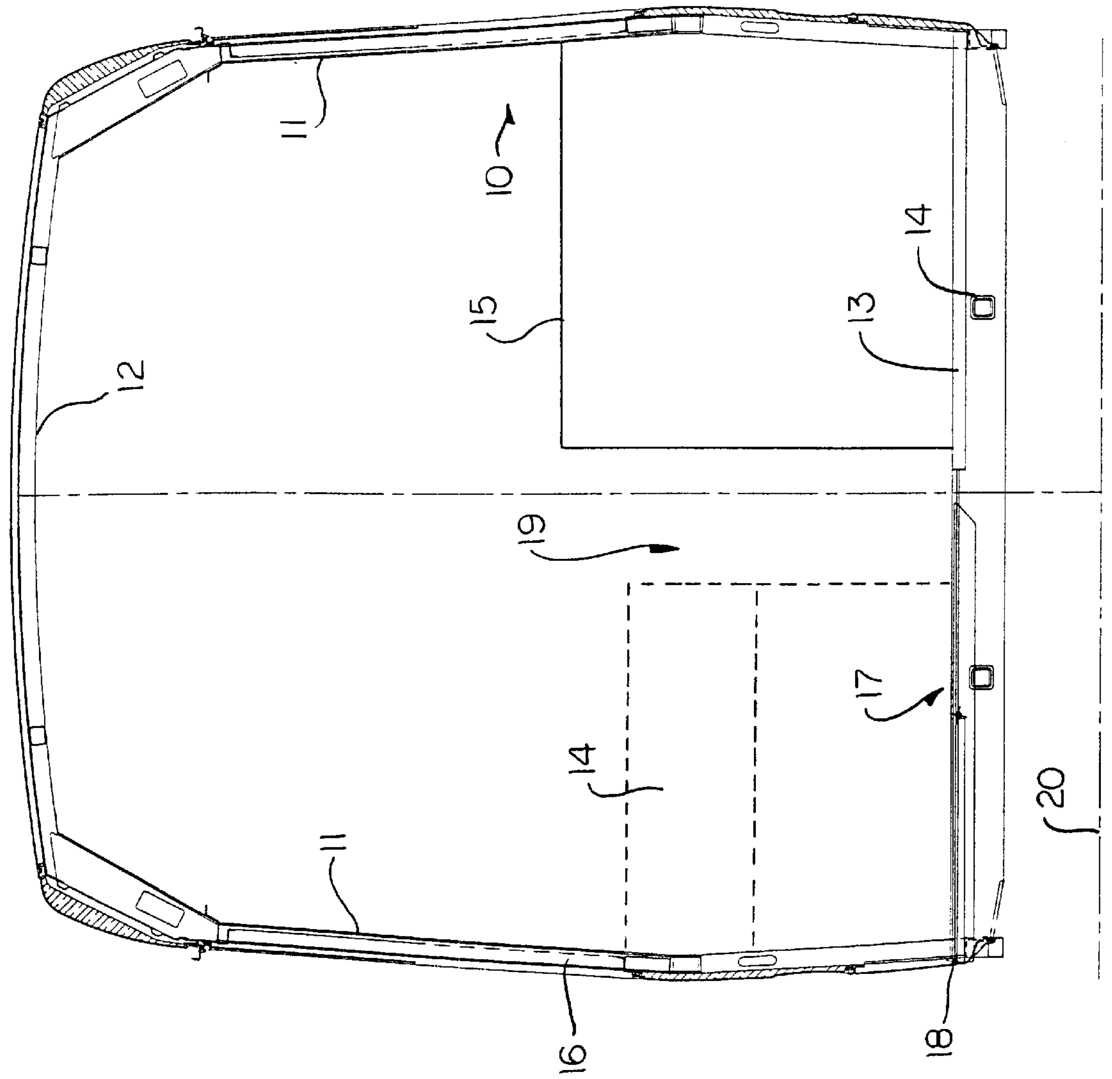
FIG. 1 is a vertical cross sectional view through a public transit vehicle showing primarily a passenger entrance ramp according to the present invention in a retracted position of the ramp with the drive components omitted for convenience of illustration.

A transit vehicle 10 is shown in cross section in FIG. 1. This includes side walls 11, a roof 12 and a floor 13 mounted on a suitable frame structure 14. The details of the vehicle structure are well known to one skilled in the art and can vary in accordance with design requirements.

The vehicle includes rows of seats 14 shown in phantom together with a drivers compartment 15 on a side of the vehicle opposite to a doorway 16 through which passengers can enter and depart from the vehicle. In front of the rows of seats is provided an entry platform area generally indicated at 17 onto which the passengers can enter by stepping over an entry threshold 18 before turning and entering an alleyway 19 between two rows of seats.

The floor 13 is arranged at a low height, where able bodied passengers can step from ground level 20 directly onto the platform surface without the need for steps between the two. However it is essential also in transit vehicles of this type to provide a ramp by which a wheelchair occupant can also enter the vehicle. The ramp is generally deployed only when an potential passenger utilizing a mobility aid such as a wheel chair presents him or herself for entry, and therefore at most stops the passengers are expected to enter the vehicle without the assistance of the ramp.

The use of the low floor structure provides very little area underneath the floor for the mounting of the ramp structure. Therefore the ramp structure is provided at the floor level of the floor 13 and forms the entry platform onto which the able bodied passengers step while at the same time being movable into a deployed position in which the sections of the platform move outwardly to form a ramp allowing the wheelchair occupant to enter up the ramp onto the platform area.

Figure 4:
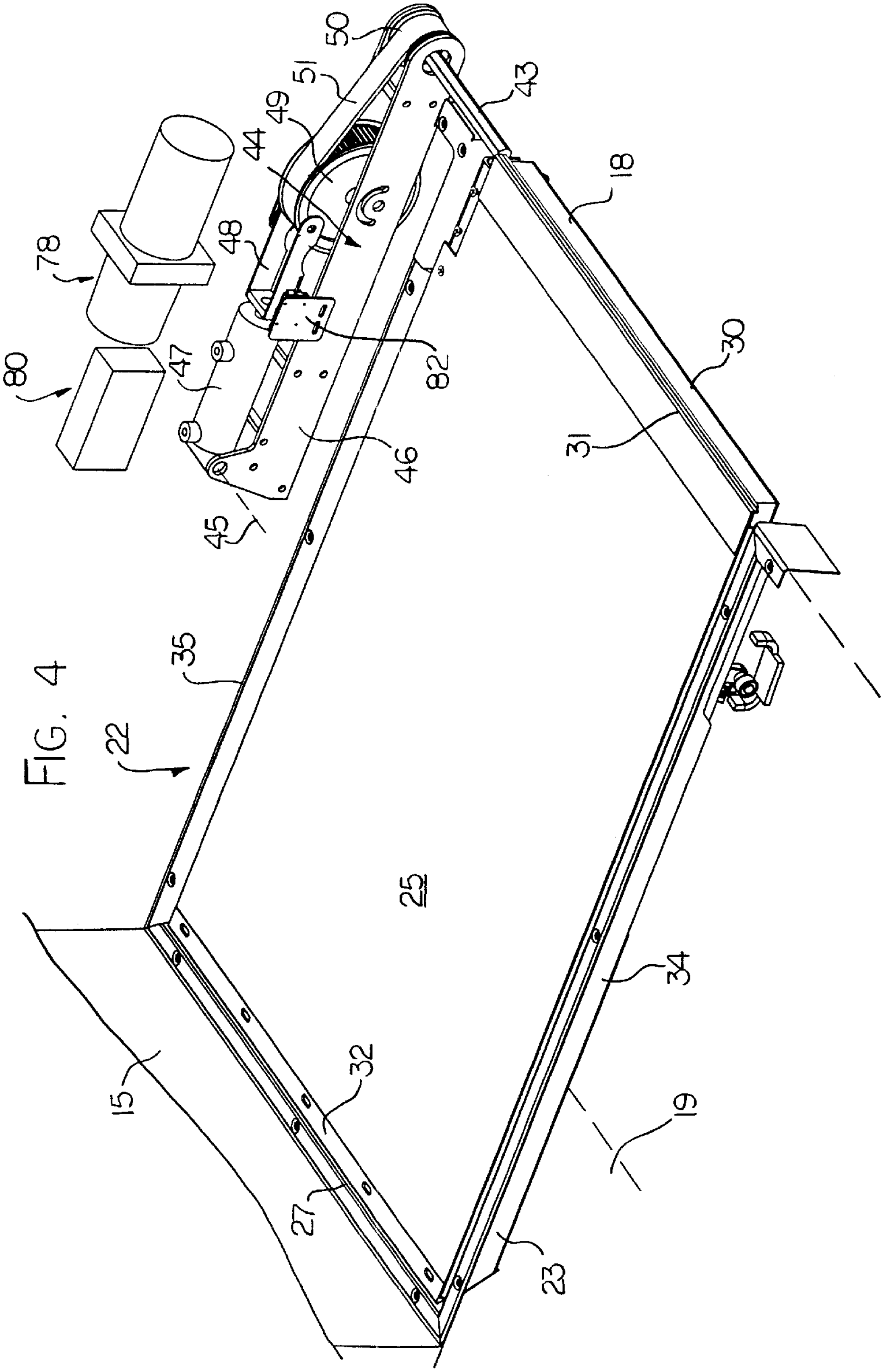
FIG. 4 is an isometric view from the top and one side showing the ramp only in the retracted position of FIG. 1 and showing particularly the drive actuator of the primary ramp panel.
Figure 5:
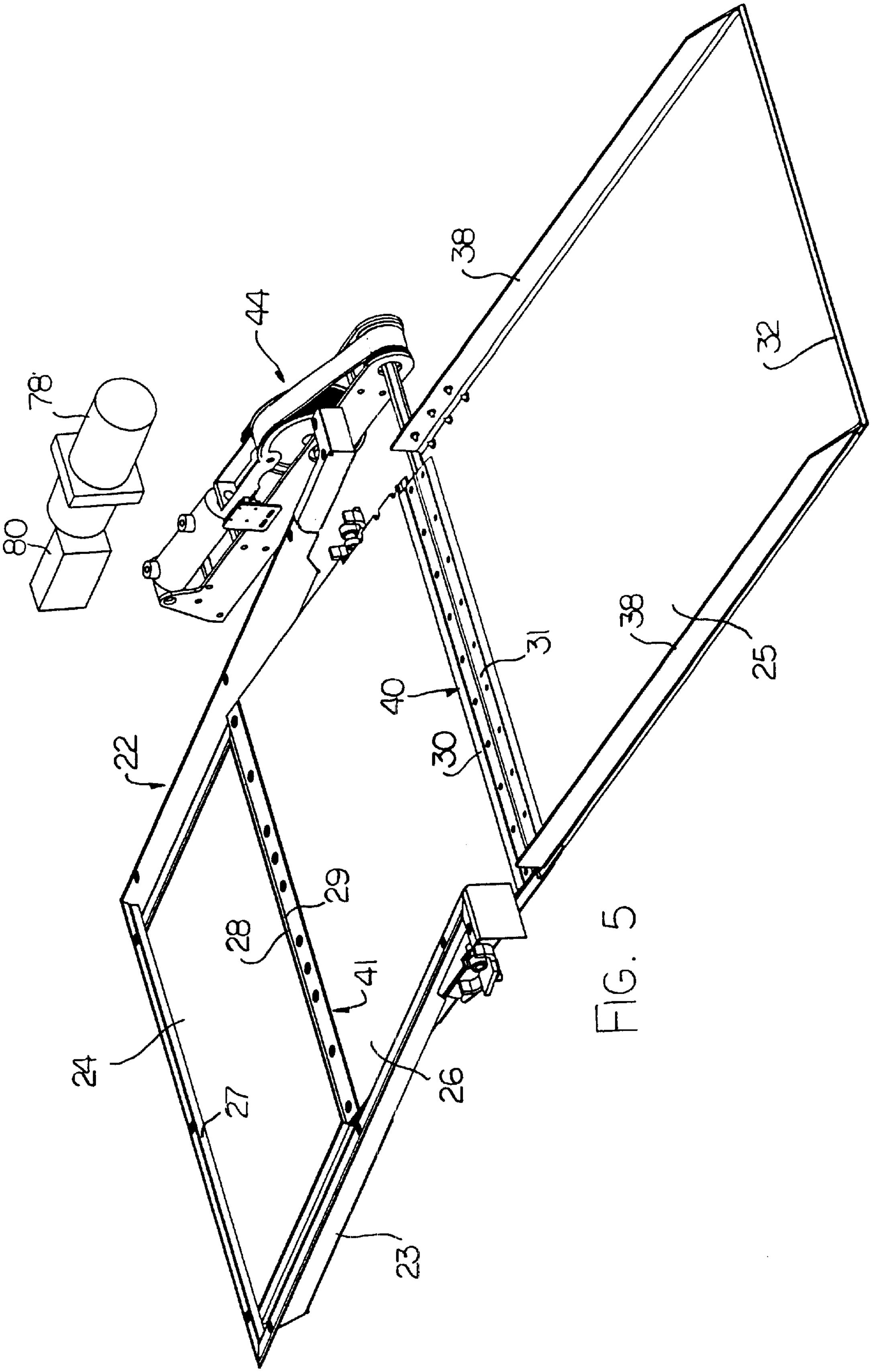
FIG. 5 is an isometric view similar to that of FIG. 4 showing the ramp only in the fully deployed position of FIG. 3.

Turning now to FIG. 4, showing an isometric view of the retracted ramp assembly which provides the platform for the able bodied passengers and also can be deployed to the position shown in FIG. 5 for use as a ramp.

The ramp structure therefore generally indicated at 22 includes a surrounding support 23, a fixed platform panel 24, a primary ramp panel 25 and a secondary ramp panel 26.

In general, the fixed platform panel 24 has an innermost edge 27 and an outer edge 28. The secondary ramp panel has an inner edge 29 pivotal about a hinge structure at the inner edge 29. The secondary ramp panel has an outer edge 30 and the primary ramp panel is pivotal about a hinge structure at an inner edge 31 of the primary ramp panel which coincides with the outer edge of the secondary ramp panel. The primary ramp panel has an outermost edge 32 arranged to rest on the ground as an entry edge over which the wheelchair rolls in the deployed ramp position of the ramp structure.

Thus in general the ramp structure can be moved to the retracted position shown in FIG. 4 in which the primary ramp panel 25 is inverted and covers both the secondary ramp panel and the fixed platform panel. All the panels are horizontal in this position and the outermost edge 32 is moved to a position substantially overlying the innermost edge 27. These three panels have a common width between two parallel side rails 34 and 35 of the support 23. Thus in the position shown in FIGS. 1 and 4, the underside of the primary ramp panel acts as the platform onto which the able bodied passenger can enter, stand and leave.

Figure 2:
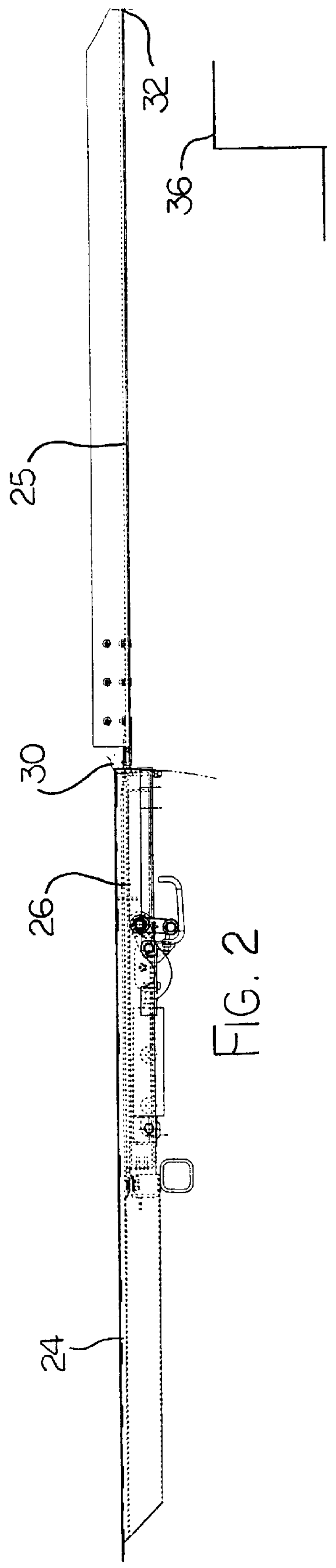
FIG. 2 is a side elevational view from the opposite side relative to that of FIG. 1 showing the ramp only in a partly deployed position in which the primary ramp panel is moved through 180 degrees to its outwardly extending position.

In general in a first deployment movement, the primary ramp panel 25 rotates about the hinge at the inner edge 30 through an angle of the order of 180 degrees so that it moves from the inverted position on top of the panels 24 and 26 to the position shown in FIG. 2 where the primary ramp panel projects outwardly to one side of the vehicle that is beyond the threshold at the outer edge 30 of the secondary ramp panel. In this position shown in FIG. 2, the primary ramp panel 25 can move downwardly so that the outer edge 32 moves into engagement with a curb 36 to act as a ramp over which the wheelchair can pass up the inclined ramp surface onto the horizontal secondary ramp panel 26. The primary ramp panel 25 is free to float around the position shown in FIG. 2 so it can take up the required height on the curb 36 simply by floating downwardly to the required position until it stops butting the curb 36. The downward floating action prevents the application of downward force by the ramp panel onto a toe or an other element which can be damaged.

Figure 3:
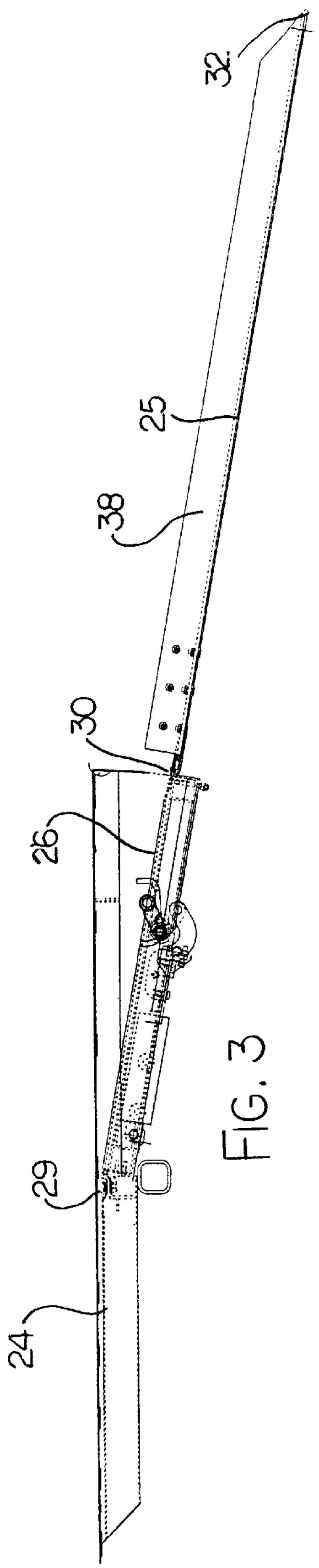
FIG. 3 is a similar side elevational view to that of FIG. 2 showing the ramp in its fully deployed position.

In the event that there is no curb and it is necessary for the bottom edge 32 of the primary ramp panel to move downwardly beyond the height of the curb to the ground level the secondary ramp panel 26 can also move downwardly from the raised horizontal position shown in FIG. 2 to the lowered position showed in FIG. 3. Thus its inner edge 29 remains in the horizontal plane of the platform panel while its outer edge 30 moves downwardly to the lowered position as shown in FIG. 3. The primary and secondary ramp panels in most deployment situations form a single ramp extending from the outermost edge 32 to the inner edge 29. The length of the ramp so formed is thus significantly longer than the length of the primary ramp panel itself thus reducing the angle necessary to accommodate the height between the height of the floor and the ground surface.

It is undesirable that the primary and secondary ramps when both deployed take up a position in which the angle between the ramps is different from 180 degrees. The inclined of the primary and secondary ramps should therefore be the same when both ramps are deployed. The operator is therefore instructed when actuating the secondary ramp at the end of movement of the primary ramp to ensure that both ramps are in a flat plane before allowing boarding.

While the angle of the primary ramp alone necessary to bridge the whole of the difference in height between the floor and the ground surface would be in practice too steep for reasonably and safely accommodating wheelchair access, the angle of the combined ramp is reduced and therefore is within the acceptable range for the wheelchair.

In general, therefore, the operator can operate initially the primary ramp panel to deploy to outwardly extended position and can then choose to operate the secondary ramp panel if necessary so as to provide the required angle. Normally the operator will determine in advance whether there is a curb to be engaged by bottom edges 32 and will choose in advance whether to deploy or not to deploy the secondary ramp panel.

The geometry of the ramp structure is such that it extends in the retracted position shown in FIG. 4 from the threshold 18 to a position spaced from the edge of the driver's compartment 15. The edge 17A of the ramp structure is spaced from the edge 15A of the driver's compartment leaving a fixed platform portion therebetween which defines a portion of the alleyway.

The ramps are fully deployed, as described hereinafter, there is a horizontal space between the fixed platform and the elevated driver's platform. This space is occupied at its forward end by the fare collection box and associated stanchion. The combined elements formed by the fixed platform 24 is described hereinafter and the area 17B between the edges 17A and 15A create a substantially level horizontal platform which provides a secure resting area for the wheelchair once it has negotiated the ramp. Upon this point the wheelchair can be turned without danger of rolling back down the ramp or tilting over sideways during the turning manoeuvre.

The platform panel forms approximately one half of the length of the primary ramp panel so it is substantially equal to the length of the secondary ramp panel. This provides a length of the platform panel 24 and the fixed floor panel from the driver's compartment 15 which is approximately equal to the width of the alleyway allowing the wheelchair to pass over the top of the ramp at the inner edge 29 and to turn on the platform panel into the alleyway to enter the vehicle. In addition this provides a length of a secondary ramp panel which is sufficient to supplement the length of the primary ramp panel to form a composite ramp of sufficient length to provide the required slope while accommodating the full height between the floor and the ground. In this regard, some vehicles of this type may have a kneeling action where the driver can lower the suspension by a distance of the order of two inches so as to further reduce the height between the floor and the ground surface.

The primary ramp panel 25 is formed by a flat sheet of a suitable material which is stiffened by a pair of upstanding flanges 38 each along a respective side edge of a panel. In the deployed position the flanges 38 stand upwardly and thus form side guides which prevent the wheels of the wheelchair from slipping over one side edge if misdirected. In the retracted position, the flanges 38 engage just inside the side rails 34 and 35 of the support frame and into a slot defined between the platform panel 24 and the secondary ramp panel 26 and the side rails 34 and 35. Thus in the retracted position shown in FIG. 4, the sheet defining the ramp panel lies flat on the top surface of the sheets forming the panel 24 and 26 with the flanges projecting downwardly into the slots.

The hinge between the secondary and primary ramp panels at the edge is 30 and 31 is formed by a continuous hinge arrangement generally indicated at 40 and connecting the sheets forming tho s e ramp panels. Similarly a continuous hinge structure 41 is provided at the inner edge 29 of the secondary ramp panel.

The pivotal movement of the primary ramp panel is driven by a shaft 43 connected to the primary ramp panel at the hinge 40 so the shaft 43 has an axis coincident with the axis of the hinge. The shaft is driven by an actuator generally indicated at 44 which is mounted alongside the rail 35 and extends from the hinge 40 to a mounting pivot pin 45 which is located at a position directly coincident with the axis of the hinge 41. The actuator comprises of a pair of side rails 46 which extend between the pin 45 and the shaft 43 and thus hold the structure rigid while it is free to pivot about the pin 45 and therefore to follow movement of the secondary ramp panel 26.

In the embodiments shown in FIGS. 4 and 5, the actuator comprises a linear hydraulic cylinder 47 which drives a crank 48 connected to a pulley 49. The pulley 49 co-operates with a pulley 50 connected to the shaft 43. A suitable drive member 51 interconnects the pulleys so the rotation of the pulley 49 acts to rotate the pulley 50 and thus to drive the shaft. The pulley 49 is of significantly larger diameter then the pulley 50 so that a relatively small angle of movement of the pulley 49 rotates the pulley 50 though approximately 180 degrees. The continuous drive member 51 is in the embodiment shown a tooth belt which could also be a chain or any other positive drive arrangement which ensures that a predetermined distance of movement of the cylinder 47 generates a predetermined angle of movement of the shaft 43 and therefore the primary ramp panel.

The mounting of the primary ramp actuation device 44 on a bracket which allows the cylinder, belt and drive mechanism to move downwardly with the motion of the secondary ramp allows the actuation of the secondary ramp without the necessity for it to be decoupled from the primary ramp actuator.

Figure 9:
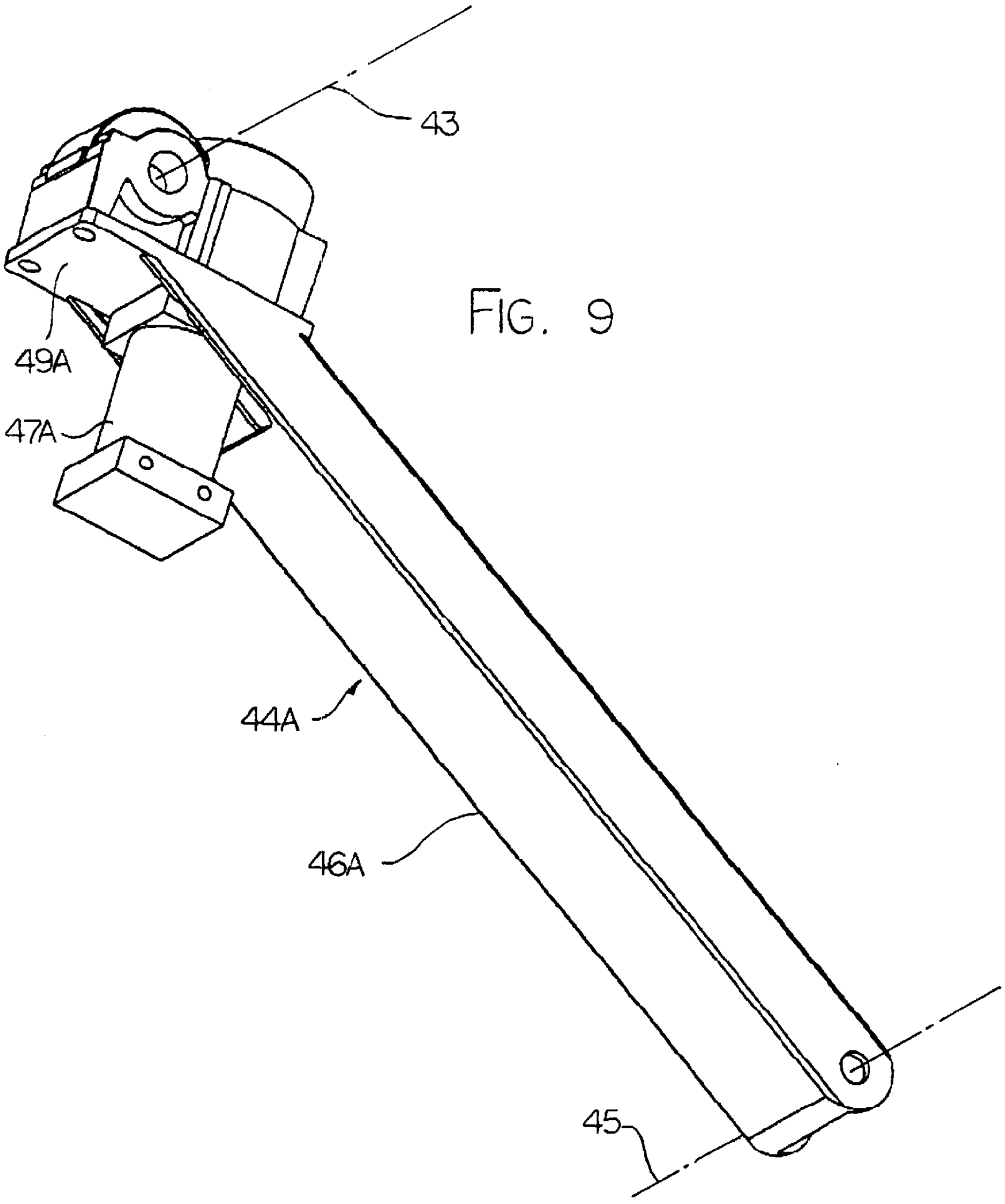
FIG. 9 is an isometric view of an alternative drive arrangement for actuating movement of the primary ramp panel.

In FIG. 9 is shown an alternative arrangement of the actuator indicated at 44A where the drive mechanism is mounted on the end of an arm 46A pivotal on the pin 45 as previously described. The device operates to drive the shaft 43 as previously described but in this arrangement there is provided a rotary vane actuator 47A in replacement for the linear cylinder 47, the output of which drives a right angle gear box 49A in which the shaft 43 is mounted. The elements are therefore mounted on the end of the arm 46A in a manner which allows the components to be mounted inboard of the side wall of the vehicle in front of the doorway and adjacent the threshold. The rotary vane cylinder thus stands in a substantially vertical direction for rotation about a vertical axis and this arrangement provides the necessary compactness of design in view of the limited space available both in the underfloor area and in the area in front of the door opening.

Figure 6:
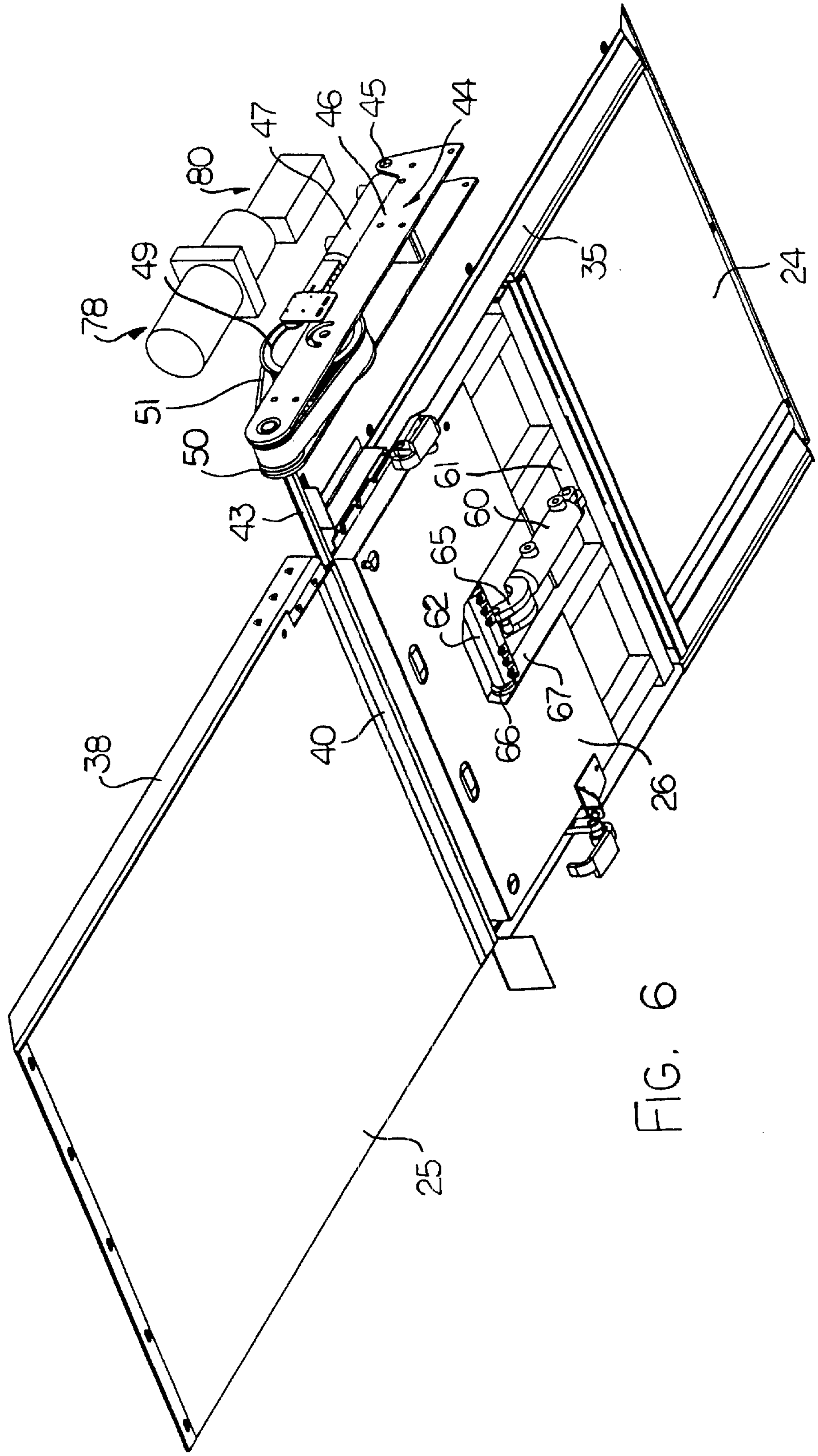
FIG. 6 is an isometric view from the bottom and the opposite side of the ramp only in the partly deployed position of FIG. 2.
Figure 8:
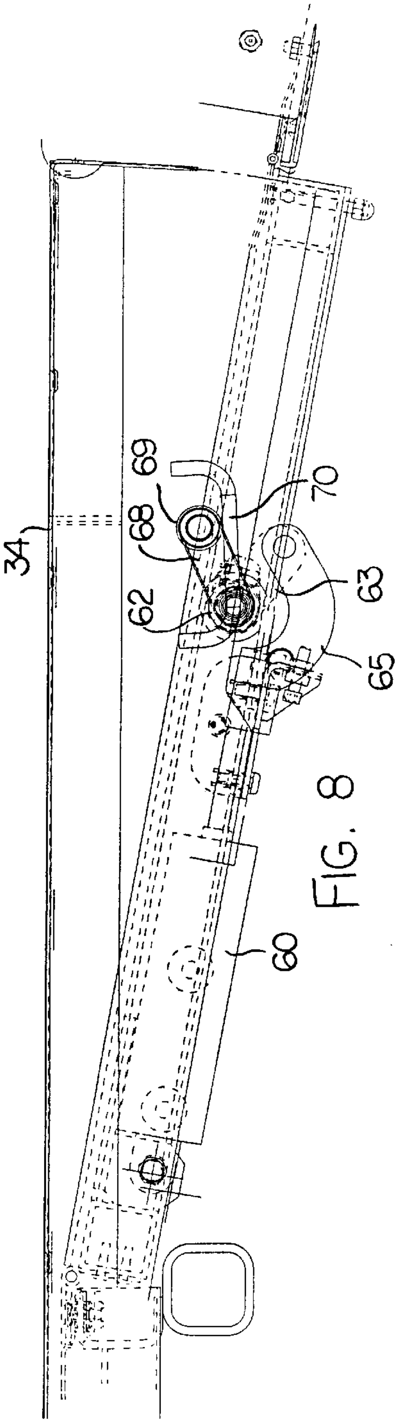
FIG. 8 is a side elevational view similar to that of FIG. 7 showing the secondary ramp panel only in the fully deployed position of FIG. 3.
Figure 7:
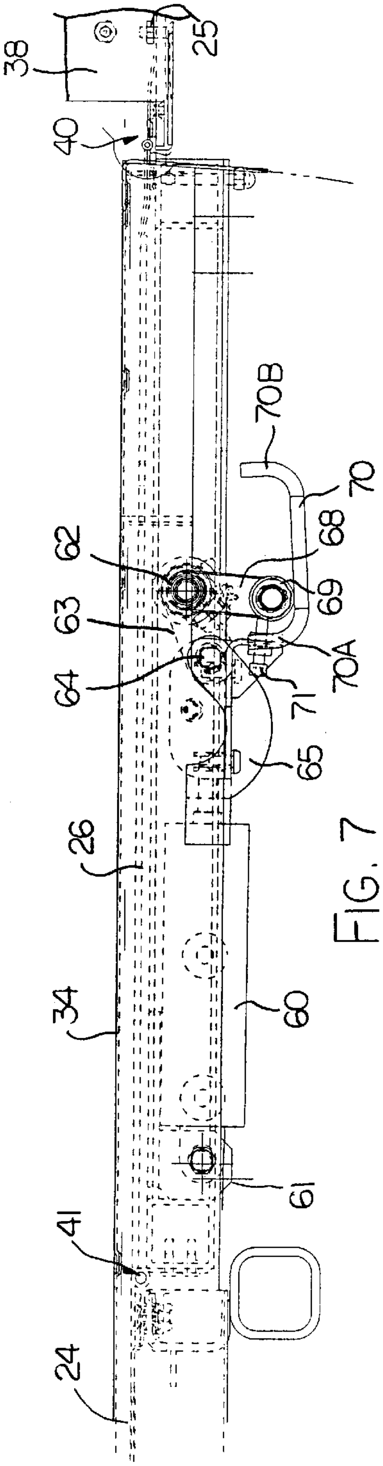
FIG. 7 is a side elevational view showing the secondary ramp panel only in the partly deployed position of FIG. 2.

Turning now to FIGS. 6, 7 and 8, the secondary ramp panel and arrangement for driving the movement of the secondary ramp panel is shown. The secondary ramp includes a top sheet and an underlying frame formed by longitudinal and transverse ribs. The drive comprises a linear actuating cylinder 60 pivotally mounted on a frame member 61 of the secondary ramp panel and extending along the length of the secondary ramp panel parallel to and underneath the secondary ramp panel. A transverse drive shaft 62 carries a crank 63 which is driven by the cylinder so as to rotate the shaft 62 through an angle of the order of 120°. The crank 63 carries a pivot pin 64 which connects to a dog leg link 65 originally connected to the end of the piston of the cylinder 60. Pivotal movement of the dog leg link 65 caused by the eccentricity of the crank 63 is taken up by the pivotal mounting of the cylinder 60 on the frame member 61. The shape of the dog leg link allows it to engage around the shaft in the outer extreme of its movement as shown in FIG. 8. As shown in FIG. 6 the cylinder and the link are mounted centrally of the shaft and the shaft extends outwardly to the sides of the secondary ramp panel and is supportive for rotation about its axis in suitable bearings 66 carried in longitudinal frame members 67. At each end of the shaft 62 is provided a crank 68 which carries on its end remote from the shaft a roller 69. The roller 69 engages onto a track 70 which is attached to the respective side rail 34, 35. The track is substantially horizontal and provides a support for the roller so that the height of the shaft 62 relative to the track 70 is governed by the angle of the crank 68 around the axis of the shaft 62.

As shown in FIG. 7, the shaft stands vertically upwardly above the roller 69 so that it is raised to its maximum height relative to the fixed track 70. In FIG. 8, the shaft 62 is moved downwardly relative to the track 70 as the crank 68 is inclined downwardly from the track. At the same time the roller 69 moves along the track. The track has raised ends 70A and 70B to confine the roller on the track. An adjustment screw 71 provides an abutment limiting the movement of the roller in the direction toward the cylinder thus preventing the crank 63 and the link 65 from going over center.

As the shaft 62 is rigidly attached to the frame of the secondary ramp panel, raising and lowering of the shaft 62 therefore raises and lowers the outer end of the secondary ramp panel from the raised position shown in FIG. 7 to the lowered or deployed position shown in FIG. 8.

In the event of a failure of the actuation system for the primary and secondary ramps, the primary ramp can be manually moved from its deployed position to its retracted position. This movement causes the edges of the flanges 38 to engage onto an abutment 75 carried on the side rail 34 and 35 thus acting to lift the secondary ramp portion from its deployed position to its retracted position so that the whole of the platform defined by the inverted primary ramp portion sits on the abutment 75 at the outer end of the support structure. Thus, in the event of failure, the platform structure within the bus can be restored to its retracted position for normal operation of the vehicle. The secondary ramp panel is lifted from the position shown in FIG. 8 while the cylinder and the cranks remain in the position of FIG. 8 simply by lifting the rollers 69 away from the track 70 to a position immediately underlying the side rails 34 and 35.

Figure 10:
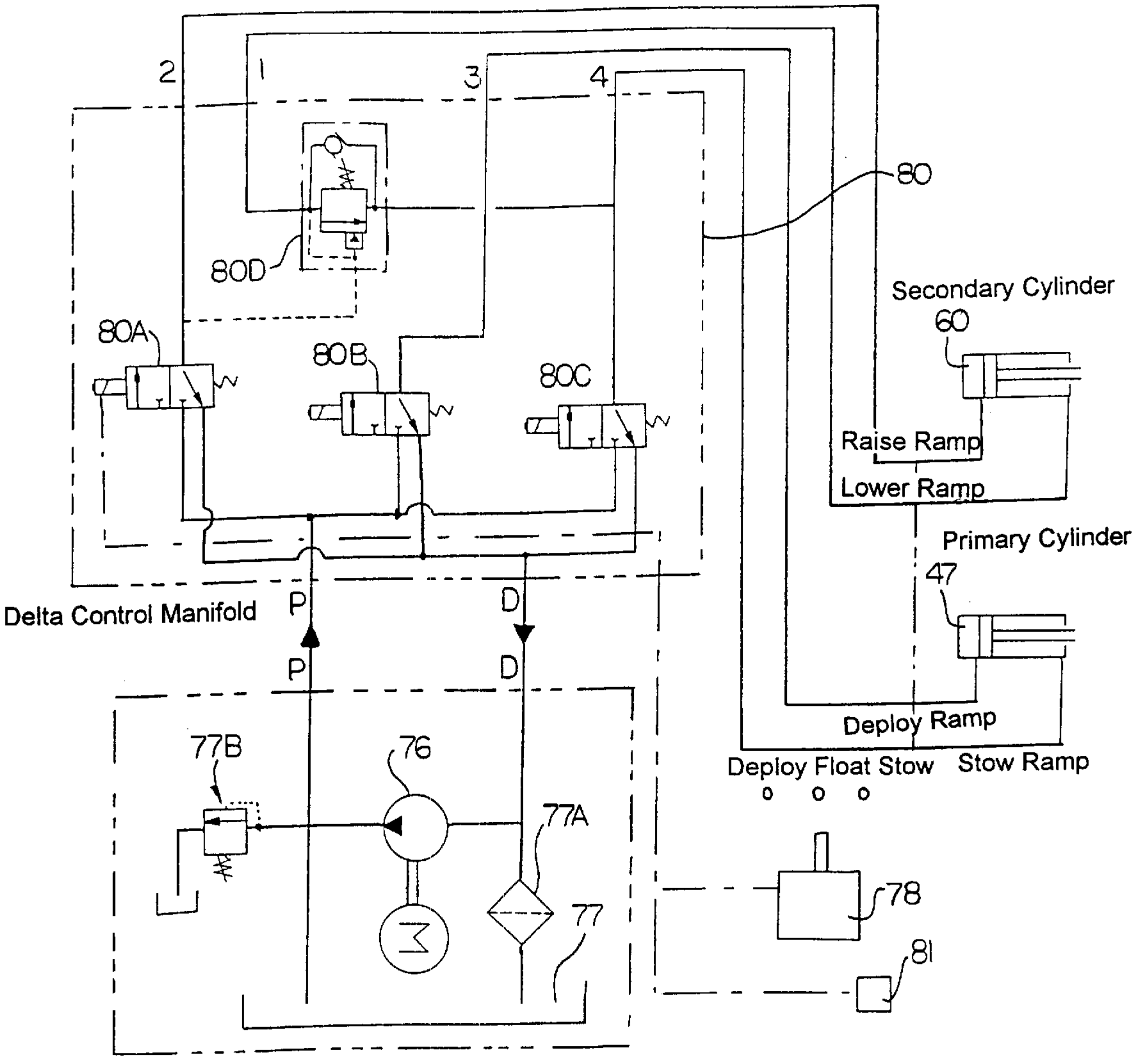
FIG. 10 is a schematic illustration of the hydraulic circuit for operating the drive actuators of the primary and secondary ramp panels.

Turning now to FIG. 10 there is shown schematically a hydraulic circuit for actuating the cylinders 47 and 60. The hydraulic circuit includes a pump 76 and a return sump 77 with a filter 77A. A pressure relief valve 77B allows pump pressure to be dumped in the event of an obstacle causing an overpressure situation in the feed line. A manually operable control lever 78 is movable between three positions indicated at "stow", "float", "deploy". The control lever 78 actuates a valve control system 80 which supplies fluid to the deploy and stow inlets of the cylinder 47 and 60. A position switch 81 detects the movement of the primary ramp panel so that the switch is actuated prior to the primary ramp panel reaching its extreme positions both retracted and deployed. The position switch 81 is provided as a pair of micro switches on a mounted panel 82 carried on the actuator 44.

The manifold 80 includes three solenoid actuated valves 80A, 80B and 80C. Each of these can be actuated for connection to the positive pressure line P from the pump or to the drain line D to the sump.

The control system 80 further includes a pilot actuated bypass valve 80D which is actuated by pressure on the lines on the valve 80A so as to effect bypass from the line 1 to line 4. It will be noted that the lines 1, 2, 3 and 4 are connected to the secondary cylinder deploy, secondary cylinder stow, primary cylinder deploy and primary cylinder stow respectively.

The position switch 81 also engages an interlock system that prevents movement of the vehicle or closure of the door while the ramp is deployed.

The position switch 81 further acts to prevent deployment of the secondary ramp until the primary ramp assumes an angle greater than 160 degrees with respect to the secondary ramp. This means that deployment, float and stow control can be managed through the single control switch 78 described above. The default position of the control switch is a floating condition. The primary ramp floats down as described until it contracts the ground. Further actuation of the switch in the deploy position actuates the secondary ramp. The position sensing switch also acts to lock the two ramps together in the further deployment phase so that at no time can the ramps assume different inclines in respect to each other.

The build up of hydraulic pressure is limited by the relief valve on the pump. This has a preset upper limit so that if the ramp encounters resistance during deployment and pressure in the system builds to a level which is greater than the pressure required to actuate the ramp, the relief valve opens relieving pressure and reversing the motion of the ramp. A circuit is also provided whereby the operator can halt the motion of the ramp during deployment and hold it in position until such time as obstacles are cleared out of the path of deployment. This arrangement is an optional feature which is not shown in the arrangement as illustrated since it requires a further position of the control device 78.

In operation, the valve control is normally maintained in the float position and in this position fluid is free to flow in each of the cylinders 47 and 60 between the deploy and stow outlets through the valve control 80 so that the aforementioned manual operation can be effected without resistance from the cylinder and so that the primary ramp panel is free to float downwardly under gravity when it reaches positions adjacent to the retracted and deployed position to prevent movement in these areas under power which could cause trapping and damage of an intervening element. In addition the float position allows the primary ramp panel to move to the required position at whatever angle is required to accommodate the exact height of the curb.

In the stow position of the control lever, the valve control system operates to supply pump pressure to the stow inlets of the cylinders 47 and 60 simultaneously so as to drive the primary and secondary ramp panels into the retracted position. As the primary ramp panel moves to the retracted position, the position detector detects the movement and releases the supply of fluid to the cylinder 47 allowing the primary ramp panel to float downwardly into the fully retracted position without power.

Further details of the hydraulic circuit will be known to one skilled in the art and therefore detailed circuit components do not need to be described herein. Further information is available from the aforementioned patent of the present assignees and reference to this document can be made if required for such further details.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A passenger entrance ramp assembly for a public transit vehicle, the vehicle having a doorway through which passengers pass for entering or departing the vehicle with a bottom edge of the doorway at floor level of the vehicle, the ramp assembly comprising:

a support structure for mounting on the vehicle at the doorway;

a primary ramp panel arranged at the doorway for movement between a retracted position within the vehicle and a deployed position in which the primary ramp panel is inclined from an inner edge of the primary ramp panel downwardly and outwardly from the vehicle to an outer edge of the primary ramp panel at the ground;

a secondary ramp panel having an outer edge of the secondary ramp panel at the bottom edge of the doorway and an inner edge of the secondary ramp panel generally parallel to the outer edge of the secondary ramp panel and spaced inwardly therefrom;

the primary ramp panel being mounted for pivotal movement relative to the secondary ramp panel about an outer horizontal axis at the outer edge of the secondary ramp panel through an angle of the order of 180 degrees relative to the secondary ramp panel while moving between the deployed position and the retracted position such that in the retracted position the primary ramp panel is inverted on top of the secondary ramp panel;

the secondary ramp panel being mounted on the support structure for pivotal movement about an inner horizontal axis at the inner edge of the secondary ramp panel such that the outer edge of the secondary ramp panel and the outer horizontal axis move upwardly and downwardly between a raised horizontal position and a lowered position;

the primary and secondary ramp panels being arranged such that, in the retracted position, the outer edge of the secondary ramp panel is in the raised position so that both the primary and secondary ramp panels are substantially horizontal and, in the deployed position, the outer edge of the secondary ramp panel is moved to the lowered position so that the primary and secondary ramp panels form a common ramp surface inclined outwardly and downwardly from the inner edge of the secondary ramp panel to the outer edge of the primary ramp panel.

2. The entrance ramp according to claim 1 wherein, if the secondary ramp panel is deployed, the primary and secondary ramp panels are maintained in a common plane.

3. The entrance ramp according to claim 1 wherein there is provided a fixed horizontal platform panel arranged at the inner edge of the secondary ramp panel and extending therefrom to an innermost edge of the platform panel generally parallel to the inner edge of the secondary ramp panel.

4. The entrance ramp according to claim 3 wherein the primary ramp panel in the retracted position overlies and covers the secondary ramp panel and at least part of the platform panel.

5. The entrance ramp according to claim 3 wherein the innermost edge of the platform panel is arranged at a position spaced from an edge of a driver's compartment and the primary ramp panel covers substantially all of the platform panel.

6. The entrance ramp according to claim 3 wherein the platform panel from the innermost edge of the platform panel to the inner edge of the secondary panel is substantially equal in length to the length of the secondary ramp panel from the inner edge of the secondary ramp panel to the bottom edge of the doorway.

7. The entrance ramp according to claim 3 wherein the platform panel, the secondary ramp panel and the primary ramp panel are equal in width.

8. The entrance ramp according to claim 1 wherein the primary ramp panel is moved between the retracted position and the deployed position by a primary panel power actuator and the secondary panel is moved between the retracted position and the deployed position by a secondary panel power actuator and wherein there is provided a control for controlling actuation of the secondary panel power actuator separately from the primary panel power actuator.

9. The entrance ramp according to claim 1 wherein the primary ramp panel is moved between the retracted position and the deployed position by a primary panel power actuator comprising a hydraulic cylinder, a first pulley connected to the cylinder, a second pulley connected to a pivot shaft of the primary ramp panel and a flexible continuous member engaged around the first and second pulleys for communicating drive therebetween.

10. The entrance ramp according to claim 1 wherein the primary ramp panel is moved between the retracted position and the deployed position by a primary panel power actuator and the secondary panel is moved between the retracted position and the deployed position by a secondary panel power actuator and wherein the primary and secondary panel power actuators include hydraulic actuators and are operated by a common hydraulic circuit.

11. The entrance ramp according to claim 8 wherein the primary ramp panel is movable manually from the deployed position to the retracted position.

12. The entrance ramp according to claim 11 wherein there is provided an abutment member for contacting the primary ramp panel when moved to the retracted position for lifting the secondary ramp panel into the retracted position.

13. The entrance ramp according to claim 1 wherein the primary ramp panel is mounted at the outer edge of the secondary ramp panel by a hinge for pivotal movement about the hinge.

14. The entrance ramp according to claim 1 wherein the primary ramp panel is moved between the retracted position and the deployed position by a primary panel power actuator comprising a rotary hydraulic actuator, a pivot shaft and a right angle gear box communicating drive from the actuator to the pivot shaft.

15. The entrance ramp according to claim 1 wherein the primary ramp panel is moved between the retracted position and the deployed position by a primary panel power actuator and wherein the primary panel power actuator is mounted on the support for pivotal movement about the inner horizontal axis.

16. The entrance ramp according to claim 1 wherein movement of the secondary ramp panel is actuated by a pair of crank members each arranged at a respective side of the secondary ramp panel and each having a support roller engaging a respective support track on the support structure for support thereby, the crank members being connected to a transverse drive shaft connected across the secondary ramp panel and driven by a hydraulic actuator such that rotation of the shaft causes the cranks to raise and lower the secondary ramp panel.

17. The entrance ramp according to claim 16 wherein the rollers are free to lift from the respective support track to allow manual movement of the secondary ramp panel from the deployed position to the retracted position.

18. The entrance ramp according to claim 16 wherein the shaft is rotated by a drive cylinder acting on a crank connected to the shaft with a dog leg drive link between the cylinder and the crank.

* * * * *